United States Patent
Nakajima (10) Patent No.: US 7,306,537 B2
(45) Date of Patent: Dec. 11, 2007

(54) DIFFERENTIAL GEARING FOR VEHICLE

(75) Inventor: Shinichiro Nakajima, Osaka (JP)

(73) Assignee: JTEKT Corporation, Osaka-shi, Osaka (JP)

(*) Notice: Subject to any disclaimer, the term of this patent is extended or adjusted under 35 U.S.C. 154(b) by 0 days.

(21) Appl. No.: 11/424,657

(22) Filed: Jun. 16, 2006

(65) Prior Publication Data

US 2006/0287156 A1 Dec. 21, 2006

(30) Foreign Application Priority Data

Jun. 17, 2005 (JP) .............................. 2005-178580

(51) Int. Cl.
*F16H 48/06* (2006.01)
(52) U.S. Cl. ..................................... 475/230; 74/606 R
(58) Field of Classification Search ................ 475/230, 475/231, 234, 251
See application file for complete search history.

(56) References Cited

U.S. PATENT DOCUMENTS

| | | | | |
|---|---|---|---|---|
| 1,546,893 | A * | 7/1925 | Haubert | ....................... 254/328 |
| 2,924,125 | A * | 2/1960 | Brandon | ....................... 475/9 |
| 6,497,027 | B1 | 12/2002 | Irwin | |
| 6,618,924 | B1 | 9/2003 | Irwin | |
| 6,780,136 | B2 * | 8/2004 | Nishiji et al. | ............... 475/221 |
| 6,840,883 | B2 * | 1/2005 | Orr et al. | .................... 475/230 |
| 2005/0049104 | A1 * | 3/2005 | Atkinson et al. | ........... 475/230 |

FOREIGN PATENT DOCUMENTS

JP 2520728 12/1996

OTHER PUBLICATIONS

European Search Report for corresponding European Patent Application No. 06 01 2252.

* cited by examiner

*Primary Examiner*—Richard M. Lorence
*Assistant Examiner*—Edwin A Young
(74) *Attorney, Agent, or Firm*—Stephen B. Salai, Esq.; Thomas B. Ryan, Patent Agent; Harter Secrest & Emery LLP (57) ABSTRACT

A plurality of pinion gears 4A, 4B which are rotatably held within a differential case 2, a pair of left and right side gears 6L, 6R disposed in meshing engagement with the pinion gears and connected to left and right axles, respectively, and thrust washers 16L, 16R interposed between the rear surfaces of the side gears and the internal surface of the differential case are provided. The differential case is of a one-piece type, and is formed with an opening 2b in its sidewall, which is used in assembling the pinion gears and the like. The internal surface of the differential case is formed with pinion gear holders 12A, 12B. The pinion gears are inserted, followed by the insertion of the side gears. The side gears are spaced from the pinion gears by an amount corresponding to the thickness of the thrust washers, and this allows the side gears to be inserted in following relationship with the pinion gears.

6 Claims, 11 Drawing Sheets

DIFFERENTIAL GEARING FOR VEHICLE

CROSS-REFERENCE TO RELATED APPLICATIONS

This application based upon and claims priority under 35 USC §119 to Japanese patent application No. 2005-178580 filed on Jun. 17, 2005, the entire contents of which are incorporated herein by reference.

BACKGROUND OF THE INVENTION AND RELATED ART STATEMENT

The present invention relates to a differential gearing for vehicle comprising a plurality of pinion gears which are rotatably held within a differential case and a pair of side gears disposed in meshing engagement with the pinion gears and connected to left and right axles, respectively, and in particular, to a differential gearing for vehicle in which the pinion gears and the side gears are contained within a differential case of one-piece type.

A conventional differential gearing for vehicle is known as having a construction as disclosed in Japanese Registered Utility Model No. 2520728, for example. This differential gearing for vehicle of the prior art will be briefly described with reference to FIG. 11. It is to be noted that reference characters for the conventional construction shown in FIG. 11 will be indicated in parentheses in this specification. Formed in a differential case (12) are a pinion-gear-receiving opening (14) and an axle-receiving opening (16), which extend orthogonally to each other. Left and right side gears (20L, 20R) are disposed within the differential case (12) so as to be axially movable therein and are splined to left and right axles (22L, 22R), respectively, which are inserted into the axle receiving opening (16). Thrust washers (24) of a smaller diameter than the side gears (20L, 20R) are disposed between the back surface (20La, 20Ra) of the left and right side gears (20L, 20R) and the internal surface of the differential case (12).

Figure 11:
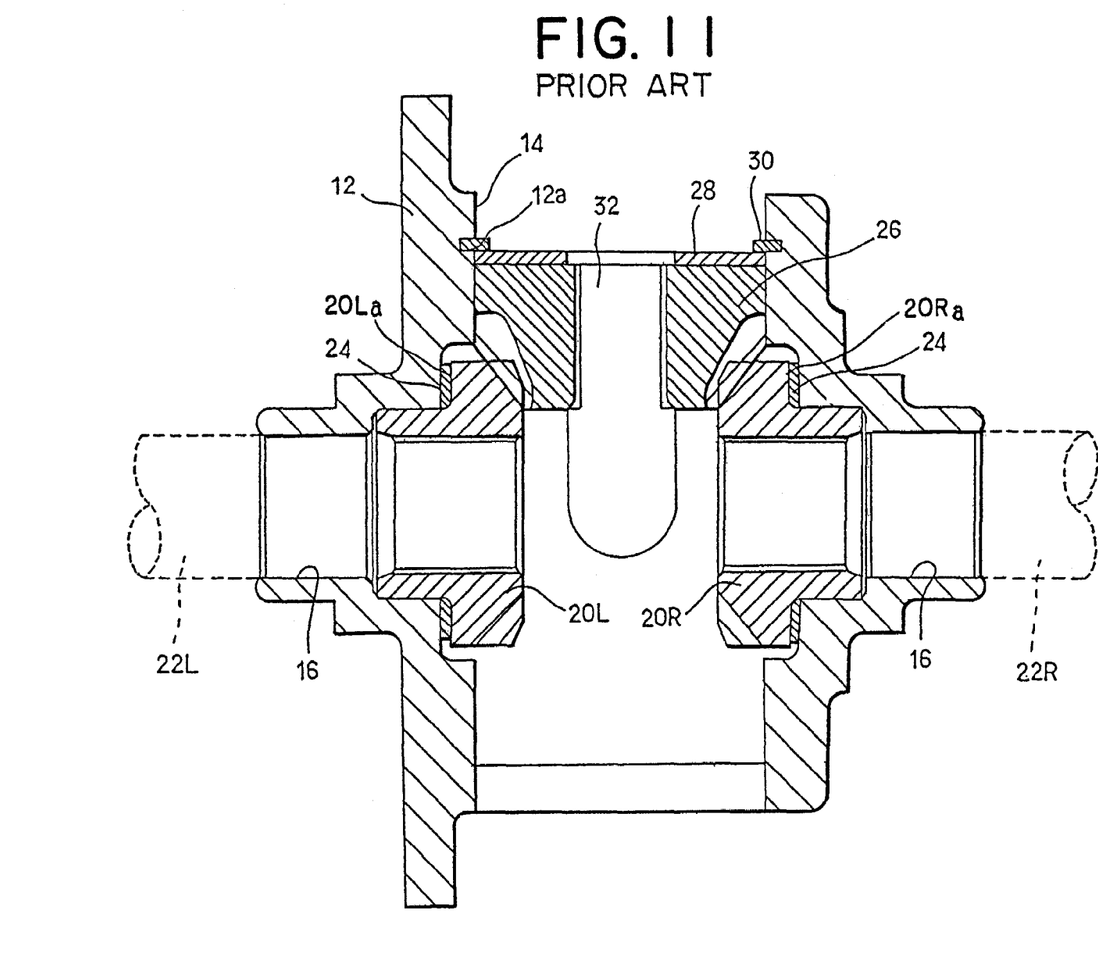
FIG. 11 is a longitudinal section of a conventional differential gearing for vehicle.

Also disposed within the differential case (12) and rotatably supported therein is a pinion gear (26) having substantially the same external diameter as the internal diameter of the pinion gear-receiving opening (14). These pinion gears (26) are in meshing engagement with the left and right side gears (20L, 20R). A pinion gear holding plate (28) is fitted over the external diameter of the pinion gear (26), which is prevented from being removed from the differential case (12) by a snap ring (30), which is fitted into a groove (12a) in the differential case (12). A pinion shaft (32) is passed through the pinion gear (26) in alignment with the axis thereof to prevent its tilting.

To assemble the differential gearing for vehicle constructed in the manner mentioned above, the thrush washers (24) and the left and right side gears (20L, 20R) are assembled from the outside of the differential case (12) into the differential case (12) through the pinion gear receiving opening (14). The pinion gear (26) is then assembled into the pinion gear-receiving opening (14) from the outside of the differential case (12) in which the side gears (20L, 20R) have been assembled so as to mesh with the latter. At this time, the pinion shaft (32) is previously disposed within the differential case (12) so that the pinion gear (26) can be passed over the pinion shaft (32). After the pinion gear (26) has been assembled into the pinion gear receiving opening (14), the pinion gear holding plate (28) is fitted, which is then prevented from being removed by the snap ring (30).

With the construction according to the invention disclosed in the cited Utility Model, the side gears (20L, 20R) cannot be inserted into the differential case (12) after the pinion gear (26) is previously assembled. Accordingly, the side gears (20L, 20R) are initially assembled into the differential case (12), and then the pinion gear (26) is inserted through the pinion gear-receiving opening (14). As a consequence, to prevent a removal of the pinion gear (26) through the pinion gear receiving opening (14), there is a need to prevent a disengagement of the pinion gear (26) by fitting the pinion gear holding plate (28) around the outer periphery of the differential case (12). There is a problem that a construction in which the pinion gear holding plate (28), a separate member, used to prevent the disengagement of the pinion gear (26) leads to a reduced strength and an increased cost of the differential case (12).

OBJECT AND SUMMARY OF THE INVENTION

Accordingly, it is an object of the present invention to improve the strength of a differential case and to achieve a reduced cost thereof. It is also an object to facilitate the assembly of the pinion gears and side gears and to improve the meshing engagement between the pinion gears and the side gears.

Above objects are accomplished by providing a differential gearing for vehicle comprising a plurality of pinion gears rotatably held within a differential case, a pair of side gears disposed in meshing engagement with the pinion gears and connected to two axles, and thrust washers interposed between the back surfaces of the side gears and the internal surface of the differential case and in which the differential case is formed, on a common circumference of the internal surface of the case with a plurality of pinion gear holders in which the pinion gears are held and openings through which side gears can be inserted at locations displaced from the pinion gear holders, the pinion gears being inserted through the openings, followed by an insertion of the side gears and the insertion of the thrust washers on the back side of the side gears to shift the side gears into normal meshing positions.

According to the invention defined in claim 1, the pinion gears are inserted into the differential case, then the side gears are inserted and followed by the insertion of the thrust washers on the back surface of the side gears to shift the side gears into normal meshing positions with respect to the pinion gears, and accordingly, the assembly of the pinion gears and the side gears is facilitated, and the meshing engagement between the pinion gears and the side gears can be improved.

The invention defined in claim 2 is characterized in that the pinion gear holder is an annular recess into which one end of the pinion gear is fitted.

According to this invention, there is no need to prevent a removal of the pinion gear, which is once assembled into the differential case by using a separate member.

The invention defined in claim 3 is characterized in that the pinion gear holders are formed at two locations which are symmetrical with respect to an axis of rotation of the differential case while the openings are formed at two locations which are symmetrical with respect to a plane including the axis of rotation of the differential case and the axis of rotation of the pinion gear.

The invention defined in claim 4 is characterized in that the differential case is a one-piece construction.

According to this invention, as a result of the described arrangement, there is no need to use separate members such as pinion gear holding plate as in the prior art, and accordingly, the strength and the assembly of the differential case can be improved and the cost can be reduced.

The invention defined in claim 5 is characterized in that the back surface of each of the side gears is formed to be spherical, and the internal surface of the differential case which supports the back surfaces of the side gears is formed as a spherical recess having a curvature which is similar to the curvature of the spherical surface on the side gears.

As a result of such construction, the side gears can be inserted into the differential case while rotating the side gears, allowing the openings in the differential case to be reduced in size and the strength to be improved.

The invention defined in claim 6 is characterized in that the center of the spherical surface of each side gear is disposed at a position that is removed beyond a midpoint between both side gears as viewed on the axis of rotation.

According to the invention defined in claim 7, the pinion gear holder has a pinion gear holding surface which is disposed in sliding contact with the pinion gear and which extends further inward into the differential case so as to support at least part of a portion of the pinion gear which is in meshing engagement with the side gear.

With the construction according to this invention, the pinion gear holding surface holds the pinion gear over an axially greater extent, more effectively suppressing a tilting of the pinion gear.

BRIEF DESCRIPTION OF THE DRAWINGS

FIGS. 6(*a*) to (*d*) illustrate successive assembling steps for the differential gearing for vehicle;

FIGS. 10(*a*) to (*e*) illustrate successive assembling steps for the differential gearing for vehicle according to the third embodiment.

DETAILED DESCRIPTION OF PREFERRED EMBODIMENTS

Figure 1:
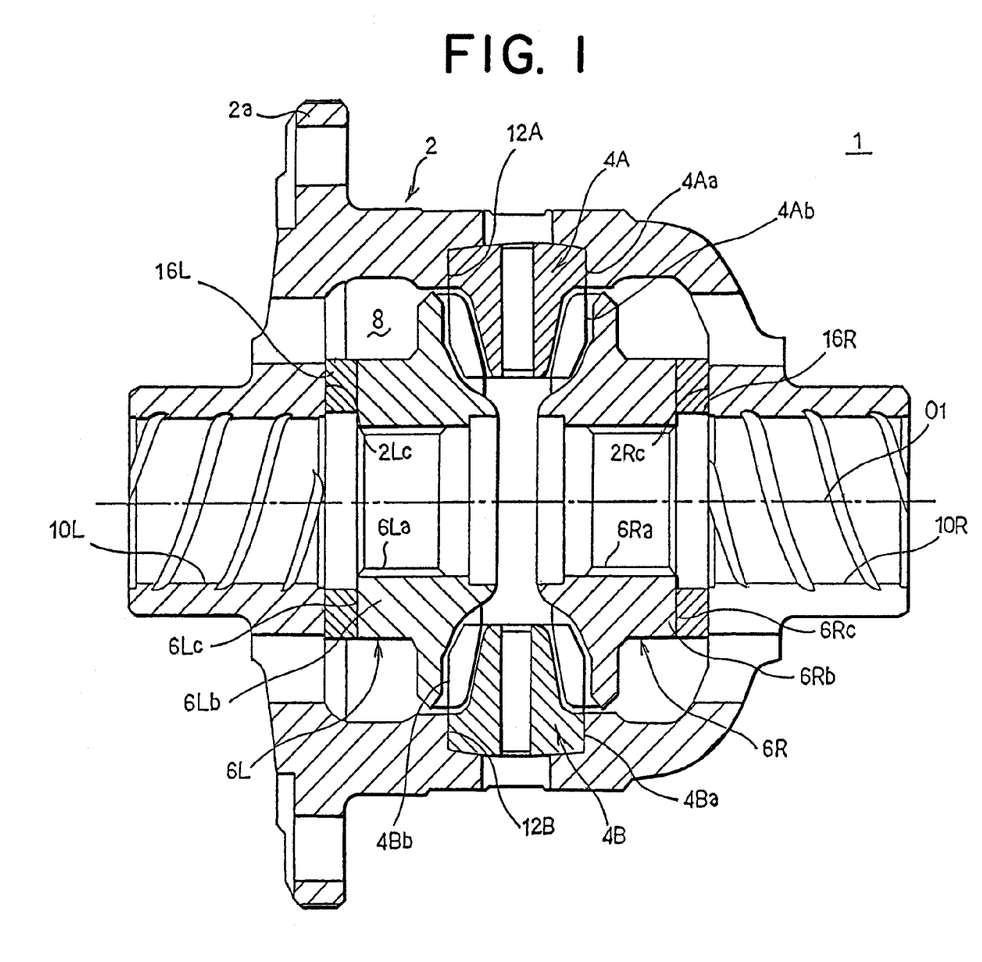
FIG. 1 is a longitudinal section of a differential gearing for vehicle according to a first embodiment as taken along an axis of rotation.

Referring to the drawings, several embodiments of the present invention will now be described. A differential gearing for vehicle 1 is of a one-piece type in which a differential case 2 is not divided into a plurality of members, and comprises a plurality of (which are two in this embodiment) of pinion gears 4 (which are indicated by characters 4A and 4B in the drawing) rotatably held by the inner peripheral surface of the case, and a pair of left and right side gears 6 (which are indicated by characters 6L and 6R in the drawing) received within the differential case 2 and which are simultaneously in meshing engagement with both pinion gears 4A, 4B and are connected to left and right axles (not shown) by splines 6La, 6Ra formed in the inner peripheral surface.

The differential case 2 is formed with axle receiving openings 10L, 10R extending through the axis thereof and into which left and right axles are passed, and are also formed with pinion gear holders 12 (12A, 12B) toward the internal surface and extending in a direction orthogonal to the axle receiving openings 10L, 10R. The pinion gear holders 12A, 12B are formed on a common circumference of the internal surface of the differential case 2 in a plane which is orthogonal to an axis of rotation O1. This embodiment represents a differential gearing 1 for vehicle of two pinion type including two pinion gears 4A, 4B, and circular pinion gear holders 12A, 12B are formed at two locations which are symmetrical with respect to the axis of rotation O1. The pinion gear holders 12A, 12B are annular recesses having an internal diameter which is substantially equal to the external diameter of carried portions 4Aa, 4Ba of the pinion gears 4A, 4B where teeth are not formed, and include inward extensions 12Ab, 12Bb (see FIG. 2) which are formed at locations which do not cause an interference with teeth of the two side gears 6L, 6R.

Figure 2:
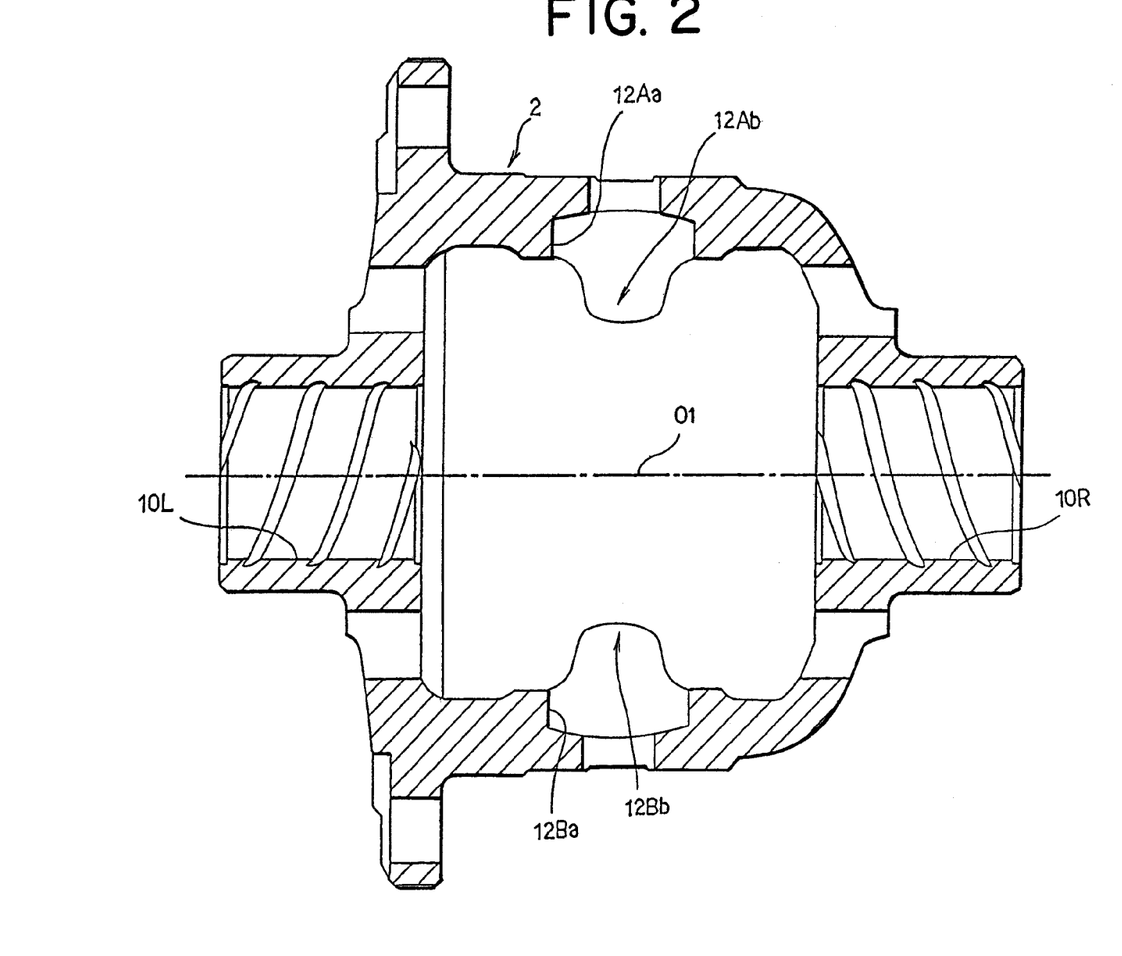
FIG. 2 is a longitudinal section taken along an axis of rotation of the differential case of the differential gearing for vehicle.

The carried portions 4Aa, 4Ba of the pinion gears 4A, 4B which are free from teeth around the entire outer peripheral surface thereof are fitted into the annular recesses of the pinion gear holders 12A, 12B, while meshing portions 4Ab, 4Bb which are in meshing engagement with the side gears 6L, 6R are partly supported by the extensions 12Ab, 12Bb for rotation. More specifically, the pinion gears 4A, 4B rotate while the tooth crests located toward the outer periphery of the meshing portions 4Ab, 4Bb which are in meshing engagement with the side gears 6L, 6R are in sliding contact with the extensions 12Ab, 12Bb. In other words, the pinion gears 4A, 4B are supported by the pinion gear holding surfaces which comprise the internal surfaces 12Aa, 12Ba of the annular recesses and the extensions 12Ab, 12Bb. In this manner, the pinion gears 4A, 4B are supported not only in their carried portions 4Aa, 4Ba, but over an axially greater extent including part of the meshing portions 4Ab, 4Bb. This construction suppresses a tilting of the pinion gears 4A, 4B. If an arrangement is made in which the extensions 12Ab, 12Bb support at least part of the meshing portions 4Aa, 4Ba of the pinion gears 4A, 4B, a tilting of the pinion gears 4A, 4B can be suppressed. However, a tilting of the pinion gears 4A, 4B can be suppressed more positively by supporting a region including a lengthwise midpoint of the meshing portions where a maximum force acts during the transmission of a torque from the pinion gears to the side gears. It is to be noted that the pinion gears 4A, 4B are carried by the pinion gear holders 12A, 12B which are formed on the differential case 2, and do not include a pinion pin extending through the axis of the pinion gear as in the conventional arrangement.

The differential case 2 is formed with a flange 2*a*, which is disposed in a plane orthogonal to the axis of rotation O1 of the differential gearing 1, and a torque from a drive pinion is input through a ring gear (not shown), which is mounted on the flange 2*a*.

The pair of side gears 6L, 6R which are received within the internal space 8 of the differential case 2 to mesh with both pinion gears 4A, 4B are bevel gears of a larger size than the pinion gears 4A, 4B, and may have a number of teeth which is equal to or greater than 2.5 times the number of teeth of the pinion gears 4A, 4B, for example. Cylindrical portions 6Lb, 6Rb having splines 6La, 6Ra mentioned above are formed around their inner peripheral surfaces extending in the axially opposite side (rear side) from the surfaces of the side gears 6L, 6R where the teeth are formed, and have end faces 6Lc, 6Rc which are flat. Thrust washers 16L, 16R are inserted between the flat end faces 6Lc, 6Rc of the cylindrical portions 6Lb, 6Rb and the internal surface (support surfaces 2Lc, 2Rc) of the differential case 2 which support these end faces 6Lc, 6Rc.

Figure 3:
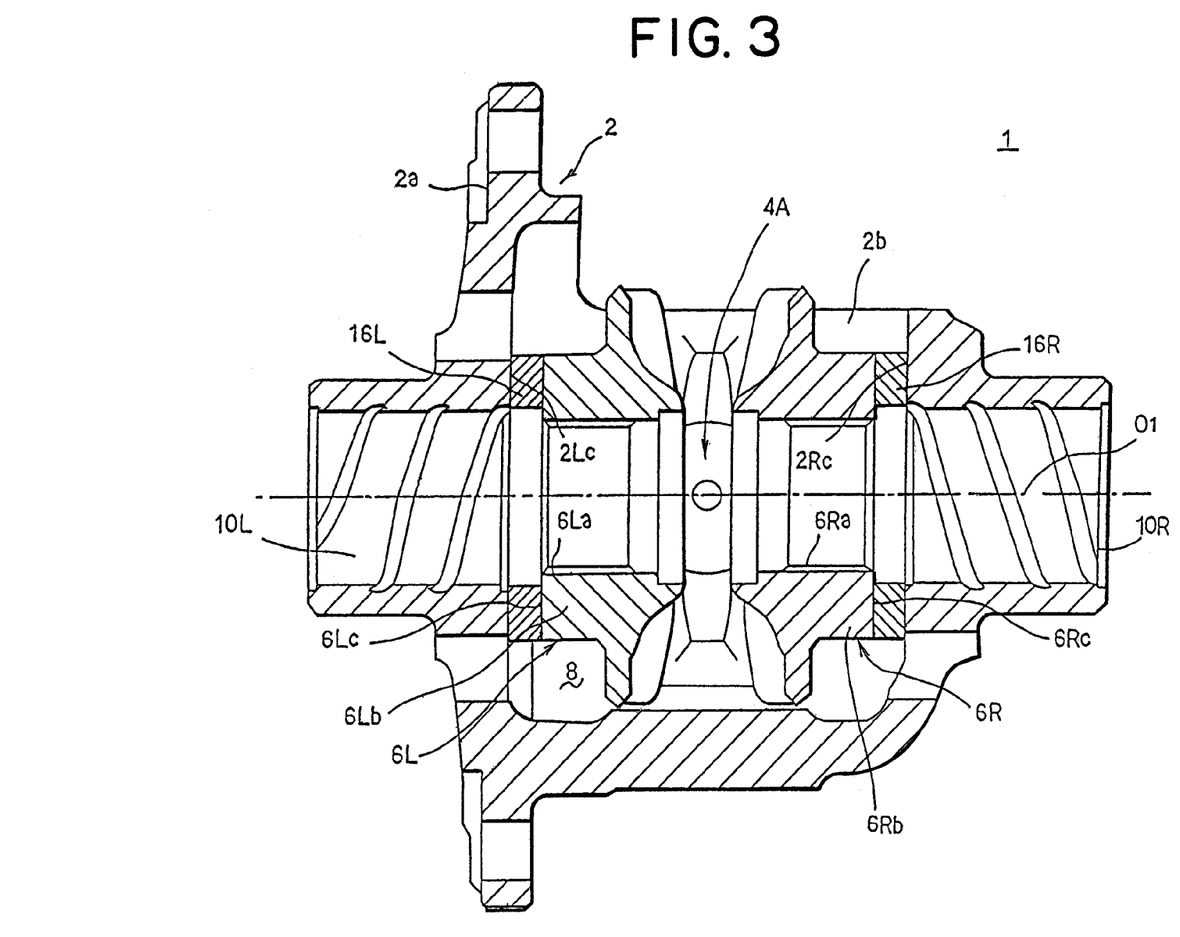
FIG. 3 is a longitudinal section of the differential gearing shown in FIG. 1, as taken through a plane which is angularly displaced by 90° for the upper portion.

Openings 2b (see FIG. 3) which are used to insert the pinion gears 4A, 4B and the side gears 6L, 6R are formed in a portion of the differential case 2 at barrel portions of a large diameter barrel in which the pinion gears 4A, 4B and the side gears 6L, 6R are contained and where the pinion gear holders 12A, 12B are not formed. The openings 2b are open to a greater size which is large enough to permit the side gears 6L, 6R of a large diameter and including rearwardly extending cylindrical portions 6Lb, 6Rb to be inserted in a direction perpendicular to the axis of rotation O1.

Figure 4:
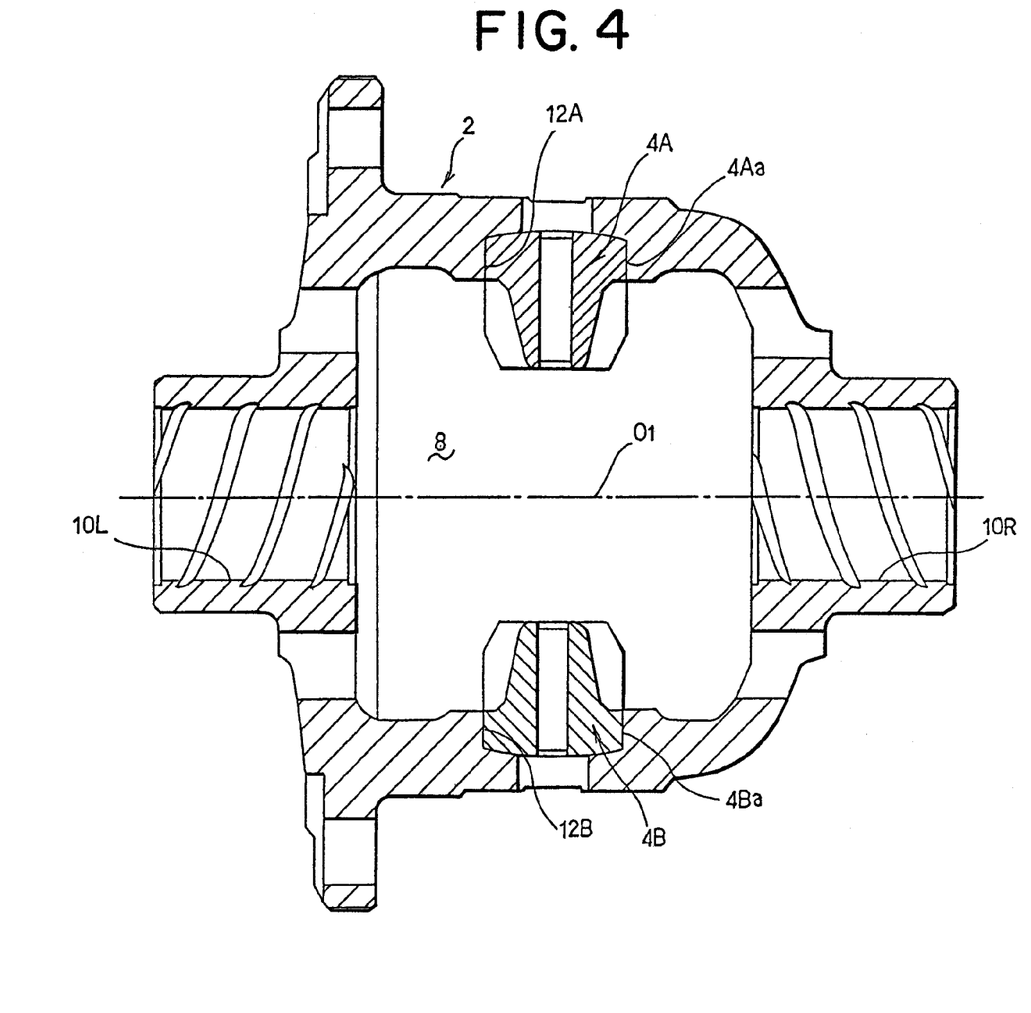
FIG. 4 illustrates an assembling step for the differential gearing for vehicle, illustrating the insertion of pinion gears.
Figure 5:
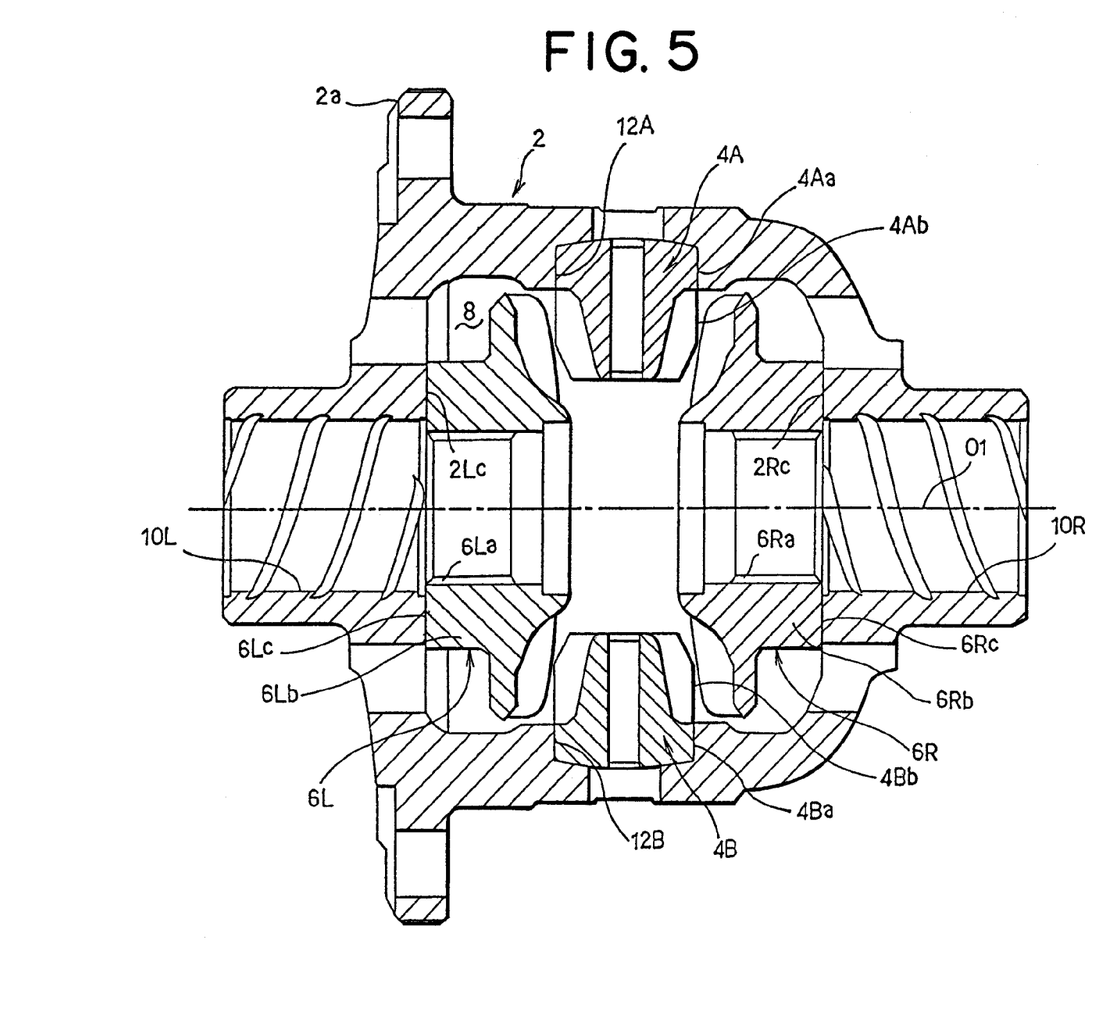
FIG. 5 illustrates an assembling step for the differential gearing for vehicle, showing the insertion of side gears.

The assembling steps for the differential gearing for vehicle 1 constructed in the manner mentioned above will now be described. Initially, the two pinion gears 4A, 4B are inserted through the opening 2b in the differential case 2, and the carried portions 4Aa, 4Ba of the pinion gears 4A, 4B are fitted into the annular recesses of the pinion gear holders 12A, 12B to be carried therein (which is a condition shown in FIG. 4). Both side gears 6L, 6R are then inserted through the opening 2b in a direction perpendicular to the axis of rotation O1. During this insertion, if the side gears 6L, 6R are brought into meshing engagement with the pinion gears 4A, 4B, there occurs an interference between the side gears 6L, 6R and the pinion gears 4A, 4B to prevent the insertion into the differential case 2. However, in this embodiment, at the time the side gears 6L, 6R are inserted, the thrust washers 16L, 16R are not yet inserted, and accordingly, the side gears 6L, 6R are retracted from their normal meshing positions, or removed from the pinion gears 4A, 4B. Accordingly, the insertion is enabled as illustrated in FIGS. 6(a) to (c) (FIG. 5 shows a condition when the side gears 6L, 6R are inserted). Arrows in FIGS. 6(a) to (d) indicate directions of movement when the side gears 6L, 6R are inserted into the differential case 2.

Subsequently, the thrust washers 16L, 16R are inserted between the rear end faces 6Lc, 6Rc of the cylindrical portions 6Lb, 6Rb of the side gears 6L, 6R and the support surfaces 2Lc, 2Rc on the internal surface of the differential case 2 which support the rear end faces 6Lc, 6Rc. As shown in FIGS. 1 and 6(d), when the thrust washers 16L, 16R are inserted, the side gears 6L, 6R are urged toward the pinion gears 4A, 4B, whereby the side gears 6L, 6R and the pinion gears 4A, 4B are assembled into normal meshing positions. When the side gears 6L, 6R are assembled into their normal positions, the application of a force to the side gears 6L, 6R in the diametrical direction cannot cause their removal as a result of an interference with the pinion gears 4A, 4B. While not shown, it should be noted that there is a need to prevent the removal of the thrust washers 16L, 16R. The thrust washers 16L, 16R may have a thickness, which allows the side gears 6L, 6R to be retracted to positions which avoid an interference with the pinion gears 4A, 4B when they are assembled into the differential case 2. In other words, the thrust washers 16L, 16R should have a thickness which is equal to or greater than a depth of meshing engagement with the pinion gears 4A, 4B as viewed in the axial direction of the side gears 6L, 6R.

The operation of the differential gearing for vehicle 1 constructed in the manner mentioned above will be described. A torque from an engine is input to the differential case 2 through a drive pinion and a ring gear, both not shown, to cause a rotation in either direction about the axis of rotation O1. The left and right side gears 6L, 6R are splined to left and right axles (not shown) to transmit the torque.

When resistances which the left and the right wheel experience are equal, the input torque is transmitted to the differential case 2, whereby the two pinion gears 4A, 4B carried by the differential case 2 and the left and right side gears 6L, 6R which are in meshing engagement with the pinion gears 4A, 4B rotate integrally, whereby an equal amount of torque is transmitted to both axles to cause left and right wheels to rotate.

When a vehicle is turning, to the left, for example, the left wheel experiences a greater resistance as compared with a right wheel. Alternatively, when one of the wheels slips due to a wrong road condition, or when a right wheel is trapped in a mire, the right wheel experiences less resistance. Under such condition, the left axle and the side gear 6L which experience a greater resistance rotate at a slower speed than the rotation of the differential case 2, and since the pinion gears 4A, 4B are inserted into the pinion gear receiving openings 12A, 12B to be rotatable therein to perform a rotation about their own axes by being supported by the pinion gear holding surfaces (the inner peripheral surfaces and the extensions of the pinion gear receiving openings, 12A, 12B), the right side gear 6R and the right axle, which experience less resistance, rotate at a greater speed than the rotation of the differential case 2.

When the engine torque is input through the ring gear (not shown), the pinion gears 4A, 4B rotate together with the differential case 2, and are urged against the pinion gear holders 12A, 12B to produce a frictional resistance. This frictional force limits a differential rotation between the left and right side gears 6L, 6R, also limiting a differential rotation between the left and right axles, which are splined to the left and right side gears 6L, 6R. In other words, when a greater torque is input as when a rapid acceleration is made, the pinion gears 4A, 4B are strongly urged against the pinion gear holders 12A, 12B, producing a greater frictional resistance to limit a differential action between left and right wheels to permit a stable acceleration. The meshing engagement between the pinion gears 4A, 4B and the left and right side gears 6L, 6R produces thrusts at the meshing surfaces between the pinion gears 4A, 4B and the side gears 6L, 6R, urging the left side gear 6L as viewed in FIG. 1 to the left and urging the right side gear 6R to the right. Such movement of the side gears 6L, 6R presses the thrust washers 16L, 16R against the support surfaces 2Lc, 2Rc of the differential case 2, producing a frictional resistance. The resulting frictional force limits a differential rotation between the left and right side gears 6L, 6R, also limiting a differential rotation of the left and right axles, which are splined to the left and right side gears 6L, 6R.

In the differential gearing for vehicle 1 according to the present embodiment, the side gears 6L, 6R can be assembled into the differential case 2 without caring about an interference with the pinion gears 4A, 4B, and accordingly, a freedom of design is improved. In addition, since the side gears 6L, 6R can be assembled into the differential case 2 after the insertion of the pinion gears 4A, 4B, the differential case 2 can be a one-piece construction which does not require a pinion gear holding plate (see 28 in FIG. 11) as in the prior art. Consequently, the strength of the differential case 2 can be improved and the cost can be reduced. There is no likelihood of removal of the side gears 6L, 6R after the thrust washers 16L, 16R are inserted, dispensing with a removal preventing function for the side gears 6L, 6R while simultaneously improving the assembly onto a vehicle. This is also effective in reducing the cost.

Figure 7:
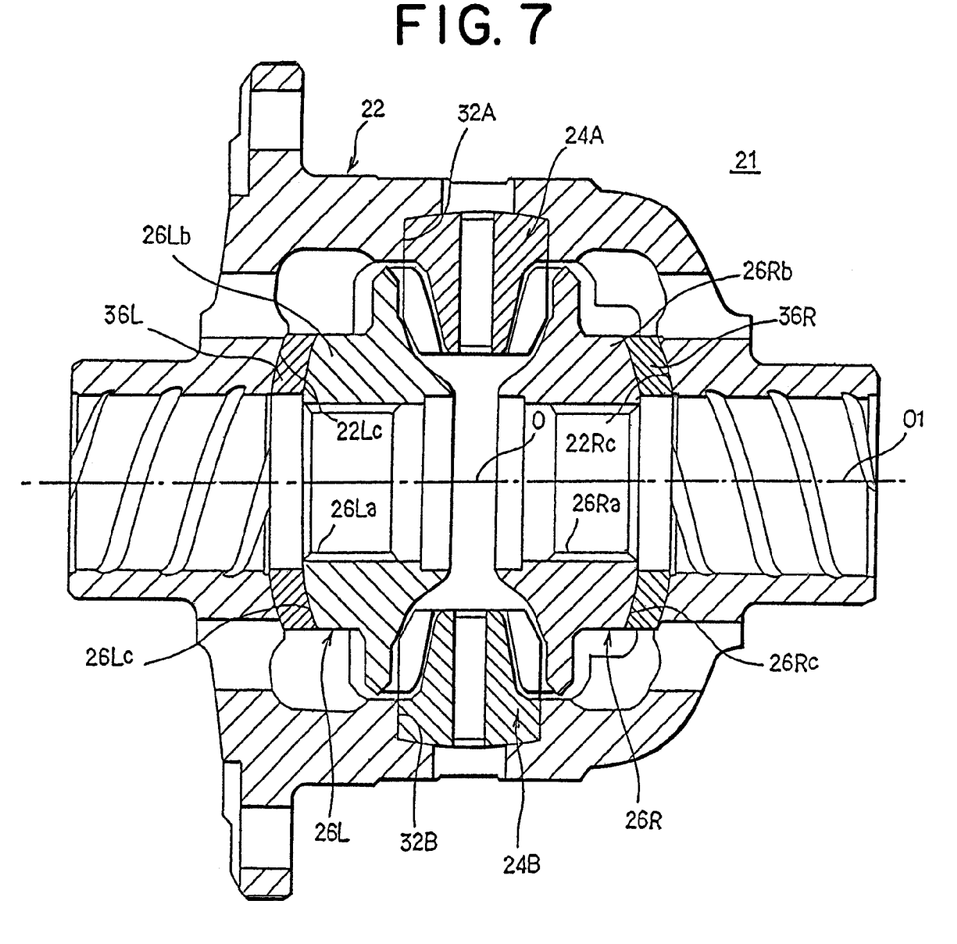
FIG. 7 is a longitudinal section of a differential gearing for vehicle according to a second embodiment as taken along an axis of rotation.

A second embodiment will be described with reference to FIGS. 7 and 8. This embodiment is essentially similar to the first embodiment in its fundamental arrangement, except for the configurations of sliding surfaces 26Lc, 26Rc formed on the back surfaces of side gears 26L, 26R and internal support surfaces 22Lc, 22Rc of a differential case 22 which support the side gears 26L, 26R.

The side gears 26L, 26R of this embodiment include cylindrical portions 26Lb, 26Rb that are formed with splines 26La, 26Ra in the inner peripheral surface, and sliding surfaces 26Lc, 26Rc formed at the rear ends of the cylindrical portions 26Lb, 26Rb that are spherical. The support surfaces 22Lc, 22Rc on the internal surface of the differential case 22 which support the spherical sliding surfaces 26Lc, 26Rc are depressed in the manner of a spherical surface with substantially the same curvature as the spherical surface of the sliding surfaces 26Lc, 26Rc of the side gears 26L, 26R. Similarly, spherical thrust washers 36L, 36R are inserted between the sliding surfaces 26Lc, 26Rc on the back surfaces of the side gears 26L, 26R and the support surfaces 22Lc, 22Rc of the differential case 22.

The spherical surfaces (sliding surfaces 26Lc, 26Rc) formed on the back surfaces of both side gears 26L, 26R each have a center disposed beyond a midpoint O between both side gears 26L, 26R as viewed on the axis of rotation O1. Thus, if the rear spherical surfaces of the two side gears share a common center, the spherical surfaces on both side gears will be parts of a single sphere that is centered at the midpoint O. However, in the present embodiment, the center of the spherical surface 26Lc of the side gear 26L which is disposed to the left as viewed in FIG. 7 is located to the right of the point O on the axis of rotation O1. Similarly, the center of the spherical surface 26Rc of the side gear 26R, which is disposed to the right, is located to the left of the point O on the axis of rotation O1. Accordingly, the distance between the back surfaces of the side gears 26L, 26R will be reduced than when the spherical surfaces on both side gears represent parts of a single sphere.

When assembling the differential gearing for vehicle 21, pinion gears 24A, 24B are initially inserted into the differential case 22 through an opening 22b and fitted into pinion gear holders 32A, 32B, and then, the side gears 26L, 26R are inserted. However, the insertion does not take place in a direction perpendicular to the axis of rotation O1 as in the embodiment 1, but takes place by rotating the spherical sliding surfaces 26Lc, 26Rc formed on the back surfaces of the side gears 26L, 26R along the spherical support surfaces 22Lc, 22Rc of the differential case 22. At this time, the thrust washers 36L, 36R are not yet inserted, and accordingly, the side gears 26L, 26R are spaced from the normal meshing positions with respect to the pinion gears 24A, 24B, allowing the side gears 26L, 26R to be assembled in the similar manner as for the embodiment 1 as shown FIGS. 6(a) to (d). After the insertion of the side gears 26L, 26R, spherical thrust washers 36L, 36R are inserted between the sliding surfaces 26Lc, 26Rc of the side gears 26L, 26R and the support surfaces 22Lc, 22Rc of the differential case 22, and both side gears 26L, 26R are advanced toward the pinion gears 24A, 24B to be assembled into their normal meshing positions.

The arrangement of this embodiment operates in the similar manner as the arrangement of the first embodiment, achieving a similar functioning and effect. By using spherical sliding portions 26Lc, 26Rc on the back surfaces of the side gears 26L, 26R to permit their insertion while rotating the side gears 26L, 26R, a relief in the differential case 21 can be reduced. In other words, the opening 2a in the differential case 22 through which the side gears 26L, 26R are inserted can be reduced in size while improving the strength of the differential case 22. While the side gears 26L, 26R may move within a given clearance, the movement occurs in the circumferential direction, permitting any fault resulting from teeth abutment to be minimized and the tooth strength to be improved.

Figure 8:
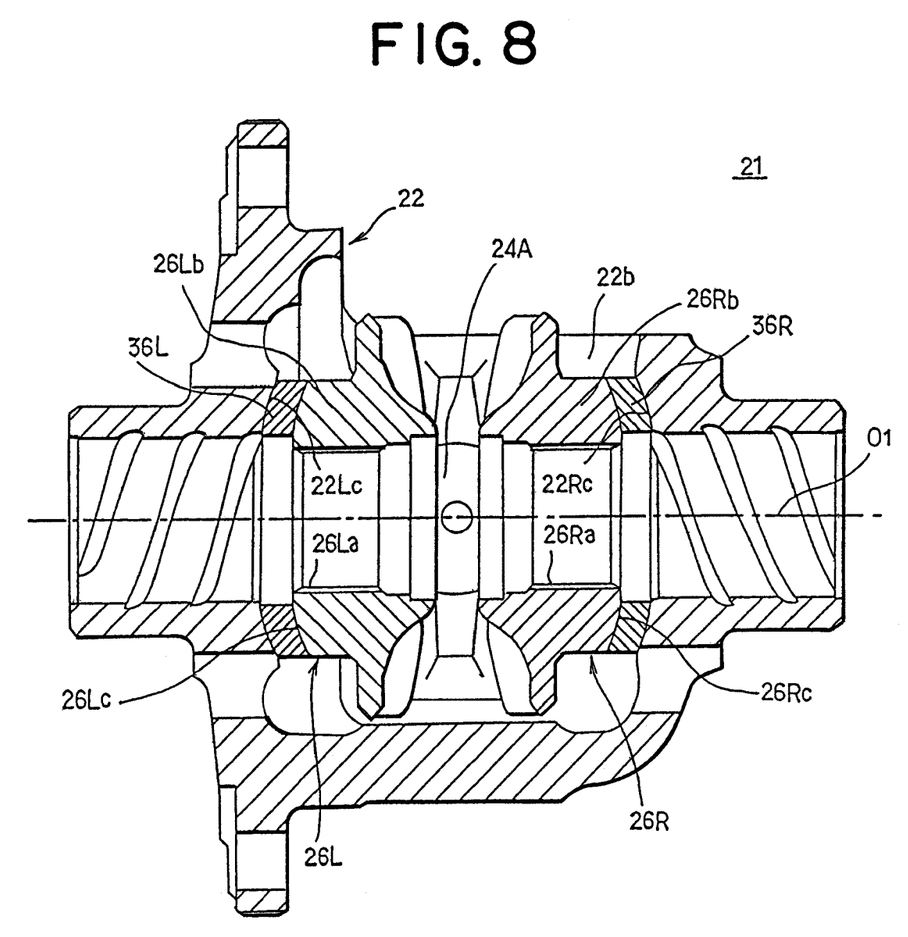
FIG. 8 is a longitudinal section of the differential gearing for vehicle as shown in FIG. 7, as taken through a plane which is angularly displaced by 90° for the upper portion.
Figure 9:
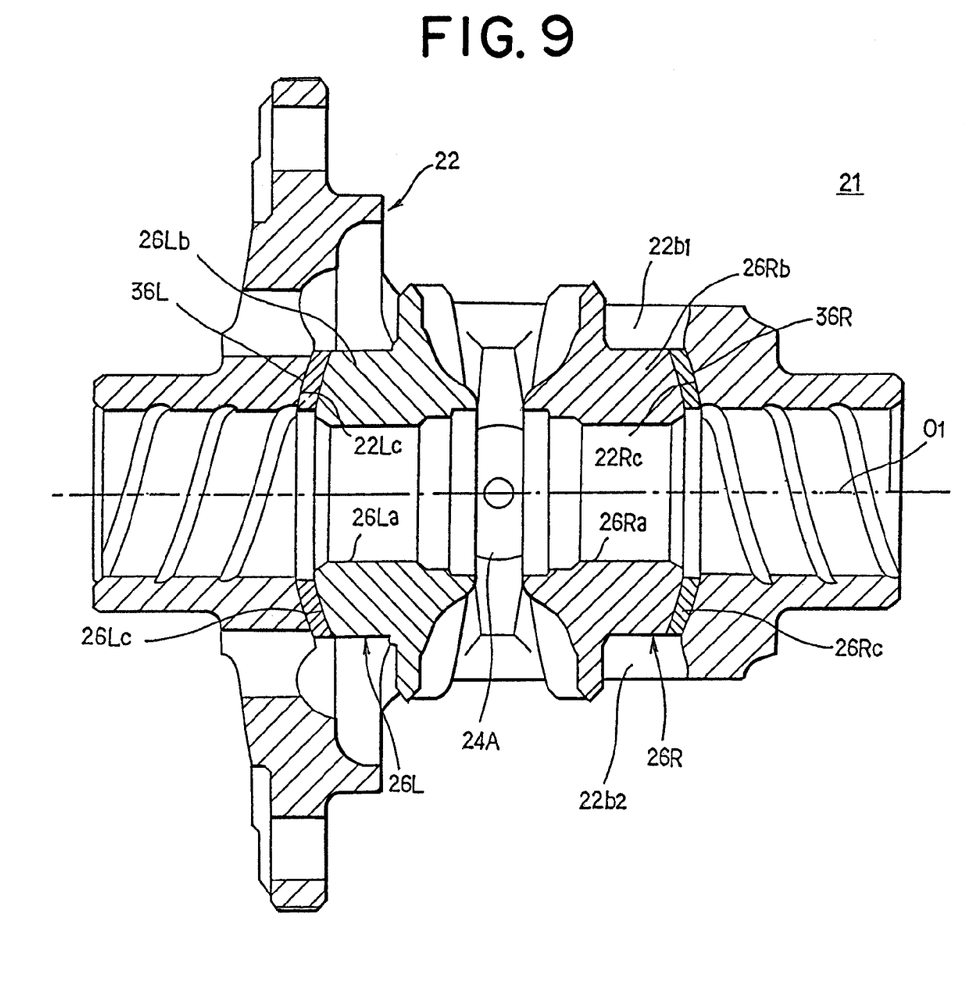
FIG. 9 is a longitudinal section of a differential gearing for vehicle according to a third embodiment as taken along an axis of rotation.

FIG. 9 is a longitudinal section of a differential gearing for vehicle 21 according to a third embodiment as taken through a plane including an axis of rotation O1, in a manner corresponding to FIG. 8 for the second embodiment. This embodiment is similar to the second embodiment in its fundamental arrangement except that openings for the insertion of the side gears 26L, 26R are formed at two locations and that thrust washers 36L, 36R have a different thickness. In other respects, the arrangement is similar to FIG. 8 showing the second embodiment, and corresponding parts are designated by like characters to omit their description. It is to be noted that the pinion gears 24A, 24B will be generically referred to as a pinion gear 24.

In this embodiment, an opening 22b1 and an opening 22b2 are formed at two locations that are symmetrical with respect to a plane including the axis of rotation O1 and an axis of rotation of a pinion gear 24. When assembling the differential gearing for vehicle 21, two pinion gears 24 are initially inserted into a differential case 22 through an opening 22b1 or 22b2 and fitted into pinion gear holders 32A, 32B. Subsequently, a side gear 26L is inserted through the opening 22b1 simultaneously with inserting a side gear 26R through the opening 22b2.

Figure 6:
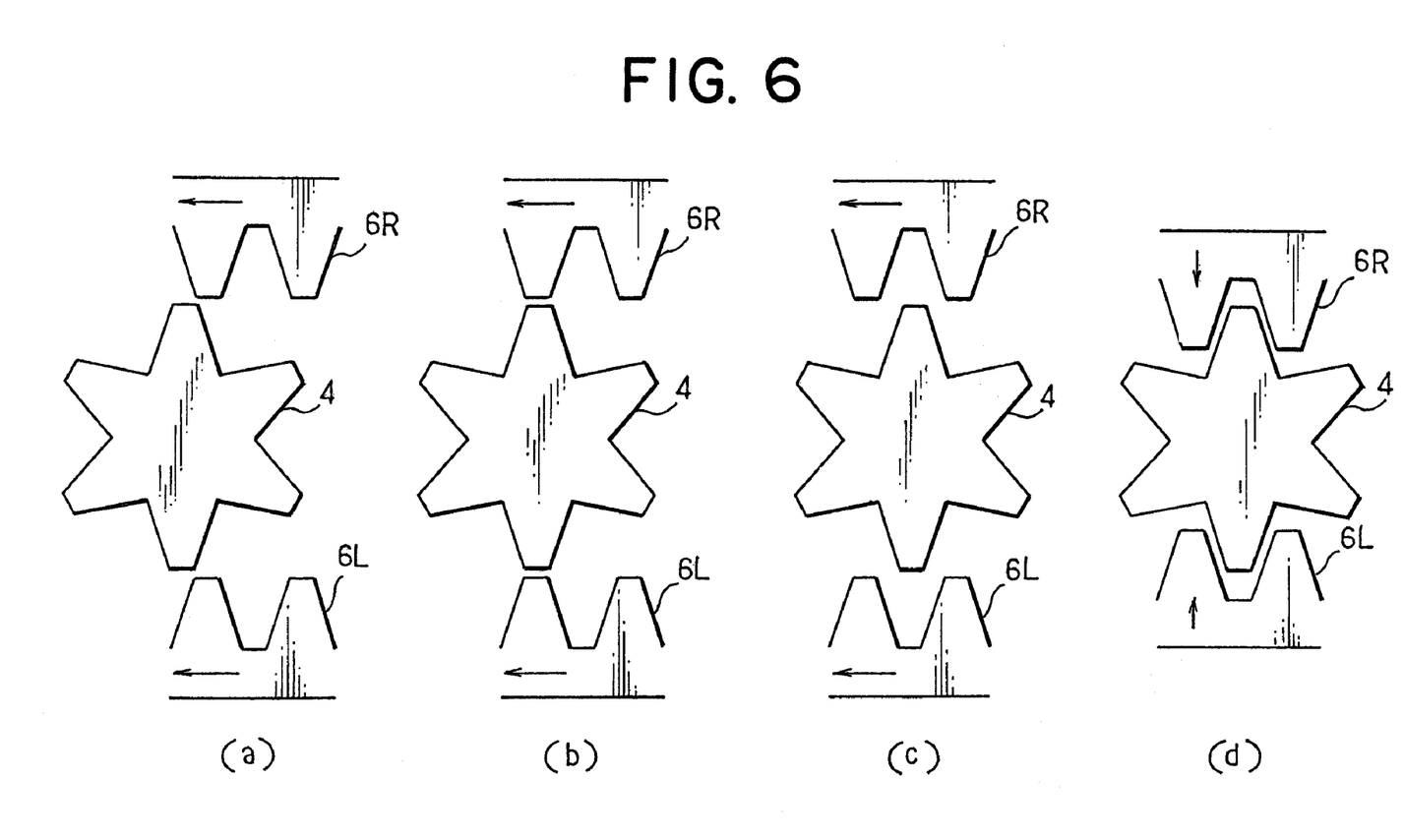
Figure 10:
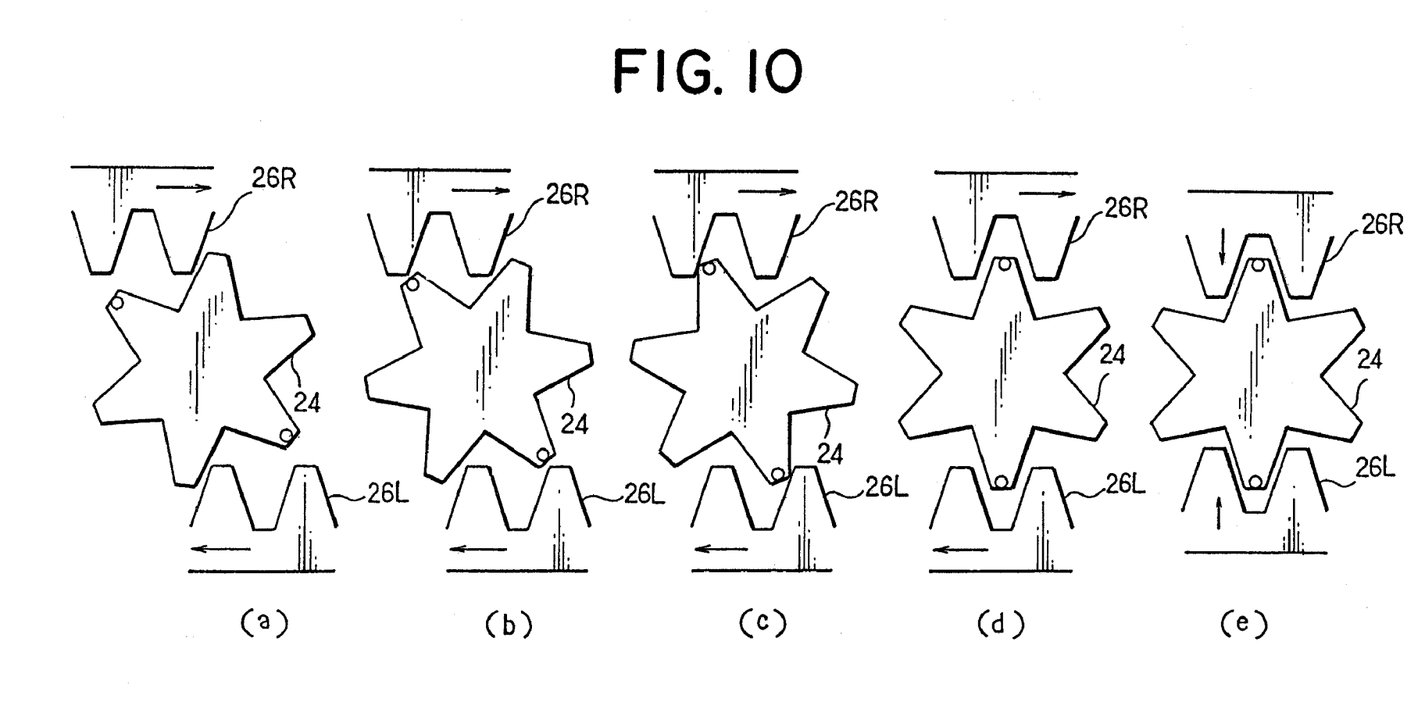

In the second embodiment, when the side gears 26L, 26R are inserted, these gears move in the same direction, and accordingly, if a contact occurs between tooth tip of the side gears 26L, 26R and tooth tip of the pinion gear 24, the side gears 26L, 26R are prevented from being inserted (see FIG. 6). However, in the present embodiment, the side gears 26L, 26R move in opposite directions with respect to the pinion gear 24, and accordingly, the side gears 26L, 26R can be inserted while rotating the pinion gear 24. Thus, if a contact occurs between the tooth tip of the side gears 26L, 26R and the tooth tip of the pinion gear 24, the insertion of the side gears 26L, 26R can take place while rotating the pinion gear 24. The detail of this manner is illustrated in FIGS. 10 (a) to (e). It is to be noted arrows shown in FIGS. 10(a) to (e) indicate directions of movement as the side gears 26L, 26R are inserted into the differential case 22. After the side gears 26L, 26R have been inserted, spherical thrust washers 36L, 36R are inserted between the sliding surfaces 26Lc, 26Rc of the side gears 26L, 26R and support surfaces 22Lc, 22Rc of the differential case 22, and both side gears 26L, 26R are advanced toward the pinion gears 24A, 24B to be assembled into normal meshing positions (when the thrust washers 36L, 36R are inserted behind the side gears 26L, 26R, a condition shown in FIG. 9 is reached).

The arrangement of this embodiment operates in the similar manner as the arrangement of the second embodiment, achieving a similar functioning and effect. Since the insertion of the side gears 26L, 26R can take place while rotating the pinion gear 24, a spacing between the side gears 26L, 26R and the pinion gear 24 during the insertion can be reduced than in the arrangement of the second embodiment. This allows the thickness of the thrust washers 36L, 36R to be reduced than in the second embodiment, enabling a reduction in the size and the weight of the arrangement. Specifically, the thrust washers 36L, 36R may have a thickness which is equal to or greater than one-half a depth of meshing engagement with the pinion gear 24 as viewed in the axial direction of the side gears 26L, 26R.

It is to be noted that the present invention is not limited to an arrangement in which the pinion gears 4, 24 are rotatably held directly within the differential cases 2, 22 as in the described embodiments, but that a different arrangement is also possible, for example, a differential gearing in which a plurality of pinion gears received within a differential case are rotatably supported by pinion pins extending through the axes of these pinion gears. In addition, in the described embodiments, an instance has been described in which the differential gearing according to the invention is applied to the transmission of a torque while permitting a differential action between left and right wheels of a vehicle, but its application is not limited thereto, but it may be applied to the distribution of torques while permitting a differential action between front and rear wheels of four wheel driven vehicle, for example.

What is claimed is:

1. A differential gearing for vehicle comprising a plurality of pinion gears rotatably held within a differential case, a pair of side gears disposed in meshing engagement with the pinion gears and connected to two axles, and thrust washers interposed between back surfaces of the side gears and the internal surface of the differential case; wherein:

the differential case is formed on a common circumference of the internal surface thereof with a plurality of pinion gear holders in which the pinion gears are held, and an opening located as displaced from the pinion gear holders for permitting the side gears to be inserted therethrough, the pinion gears being inserted through the opening, followed by inserting the side gears, and then inserting the thrust washers behind the side gears to move the side gears into normal meshing positions, the pinion gear holders are formed by annular recesses in the internal surface of the differential case, and the pinion gears have annular circumferences that are held within the annular recesses of the differential case for supporting rotation while suppressing tilting of the pinion gears within the differential case, the opening is formed at two locations which are symmetrical with respect to a plane including an axis of rotation of the differential case and an axis of rotation of the pinion gear, the differential case is a one-piece construction, the rear surface of each of the side gears is formed to be spherical, and the internal surface of the differential case which supports the rear surface of the side gear is formed as a spherical recess having a similar curvature as the curvature of the spherical surface on the side gear, and the center of the spherical surface of each side gear is located beyond a midpoint between both side gears as viewed on the axis of rotation.

2. A differential gearing for vehicle according to claim 1 characterized in that the pinion gear holding surface of the pinion gear holder which is disposed in sliding contact with the pinion gear extends inward into the differential case for supporting at least part of the meshing portions of the pinion gear which mesh with the side gears.

3. A differential gearing for vehicle comprising a plurality of pinion gears rotatably held within a differential case, a pair of side gears disposed in meshing engagement with the pinion gears and connected to two axles, and thrust washers interposed between back surfaces of the side gears and the internal surface of the differential case; wherein:

the differential case is formed on a common circumference of the internal surface thereof with a plurality of pinion gear holders in which the pinion gears are held, and an opening located as displaced from the pinion gear holders for permitting the side gears to be inserted therethrough, the pinion gears being inserted through the opening, followed by inserting the side gears, and then inserting the thrust washers behind the side gears to move the side gears into normal meshing positions, the pinion gear holders are formed by annular recesses in the internal surface of the differential case, and the pinion gears have annular circumferences that are held within the annular recesses of the differential case for supporting rotation while suppressing tilting of the pinion gears within the differential case, the differential case is a one-piece construction, the rear surface of each of the side gears is formed to be spherical, and the internal surface of the differential case which supports the rear surface of the side gear is formed as a spherical recess having a similar curvature as the curvature of the spherical surface on the side gear, and the center of the spherical surface of each side gear is located beyond a midpoint between both side gears as viewed on the axis of rotation.

4. A differential gearing for vehicle according to claim 3 characterized in that the pinion gear holding surface of the pinion gear holder which is disposed in sliding contact with the pinion gear extends inward into the differential case for supporting at least part of the meshing portions of the pinion gear which mesh with the side gears.

5. A differential gearing for vehicle comprising a plurality of pinion gears rotatable held within a differential case, a pair of side gears disposed in meshing engagement with the pinion gears and connected to two axles, and thrust washers interposed between back surfaces of the side gears and the internal surface of the differential case; wherein:

the differential case is formed on a common circumference of the internal surface thereof with a plurality of pinion gear holders in which the pinion gears are held, and an opening located as displaced from the pinion gear holders for permitting the side gears to be inserted therethrough, the pinion gears being inserted through the opening, followed by inserting the side gears, and then inserting the thrust washers behind the side gears to move the side gears into normal meshing positions, the pinion gear holders are formed by annular recesses in the internal surface of the differential case, and the pinion gears have annular circumferences that are held within the annular recesses of the differential case for supporting rotation while suppressing tilting of the pinion gears within the differential case, the rear surface of each of the side gears is formed to be spherical, and the internal surface of the differential case which supports the rear surface of the side gear is formed as a spherical recess having a similar curvature as the curvature of the spherical surface on the side gear, and the center of the spherical surface of each side gear is located beyond a midpoint between both side gears as viewed on the axis of rotation.

6. A differential gearing for vehicle according to claim 5 characterized in that the pinion gear holding surface of the pinion gear holder which is disposed in sliding contact with the pinion gear extends inward into the differential case for supporting at least part of the meshing portions of the pinion gear which mesh with the side gears.

* * * * *